United States Patent Office 3,326,066
Patented June 20, 1967

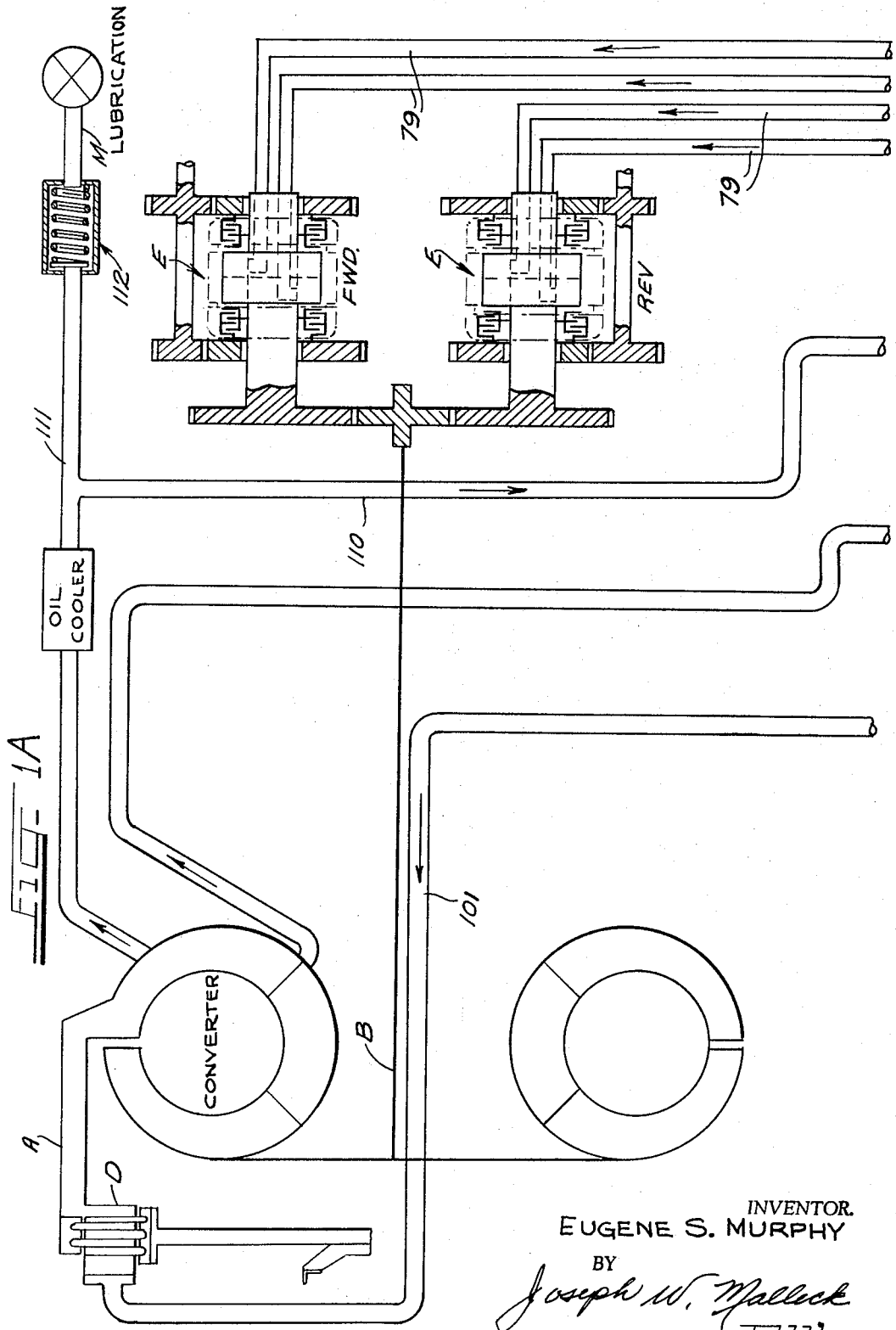

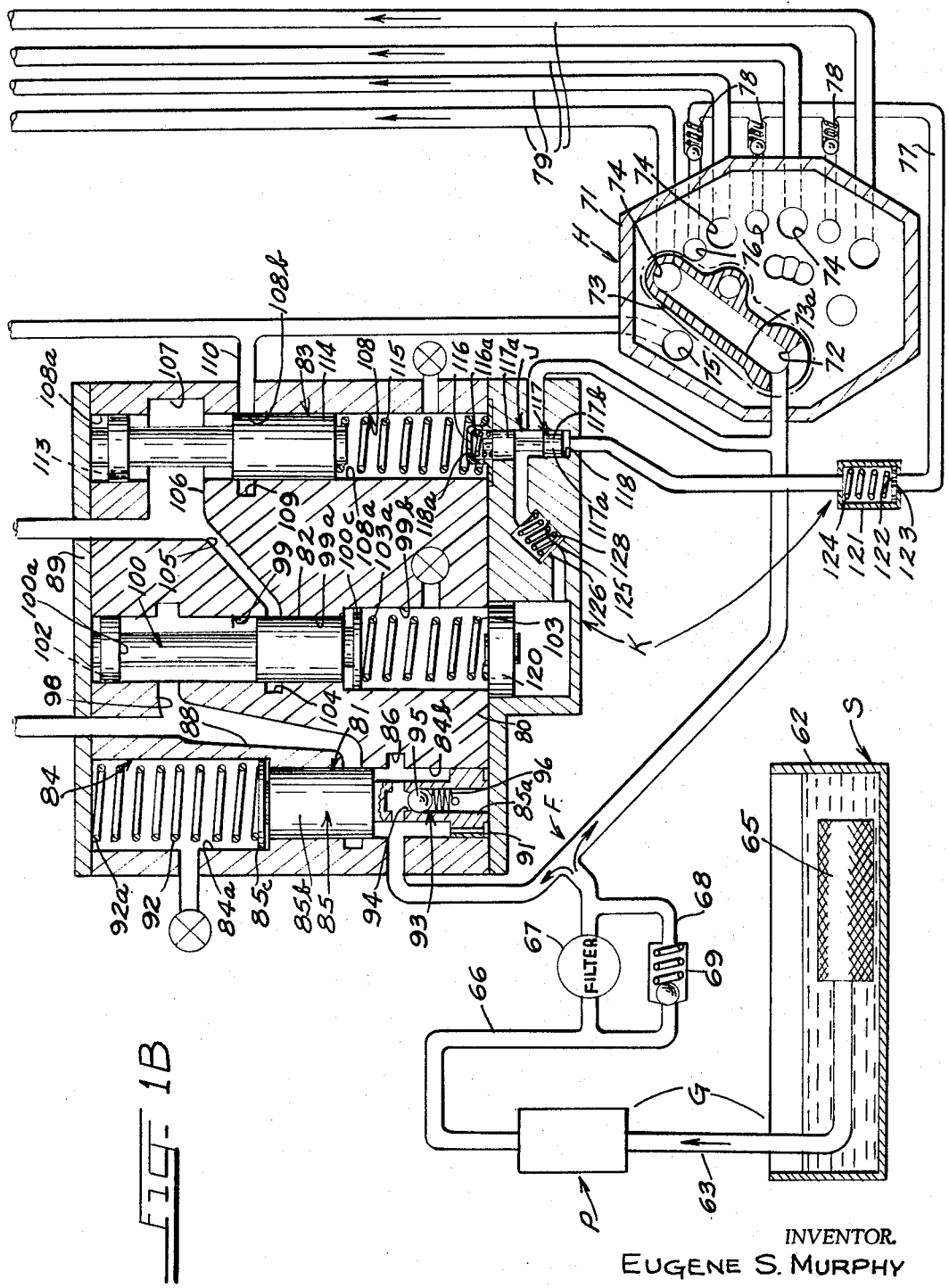

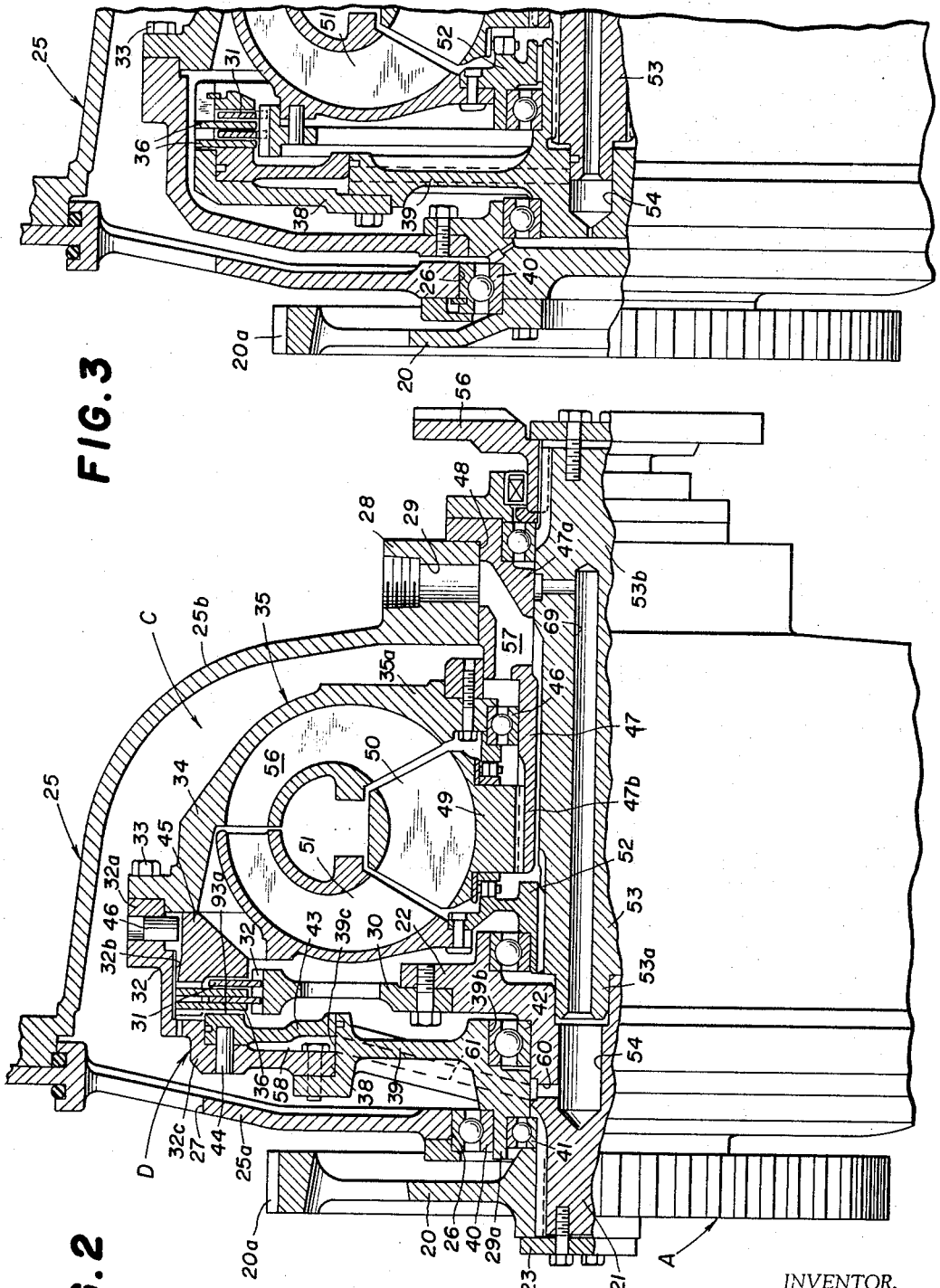

3,326,066
HYDROKINETIC AND MECHANICAL GEAR DRIVE
Eugene S. Murphy, Rockford, Ill., assignor to Borg-Warner Corporation, a corporation of Illinois
Filed Nov. 23, 1964, Ser. No. 413,253
2 Claims. (Cl. 74—732)

This invention relates to power transmissions and more particularly to transmissions employing a hydrodynamic coupling in series with a mechanical gear box, the latter being selectively changed by actuation of one or more hydraulic devices.

Vehicles having large torque requirements, particularly those in the earth moving field, have utilized hydrodynamic torque converters as a component of their transmission systems because of the advantages of a fluid cushion in the drive system and the characteristic smooth acceleration and deceleration. However, certain difficulties are encountered in changing between speed ratios of the mechanical gear box while the torque converter is maintained in full driving relationship; one such difficulty is shock which may be experienced upon completion of a gear shift. A typical example of prevalent shock is experienced with a crawler tractor, of the type having a hydrodynamic drive, when the vehicle is reversed in direction having been preceded by full throttle forward movement into a heavy load such as stumps, etc. Also in front end loader earth moving vehicles considerable shock is frequently experienced when the bracket is lifted high from a pile and the vehicle is then placed in a forward or reverse gear to begin moving.

Therefore, a primary object of this invention is to provide a power transmitting mechanism of the type having a mechanical gear box with a plurality of speed ratios selected by operation of a manual means controlling a plurality of hydraulic clutches; the mechanism has other hydraulic controls effective to interrupt the power transmitting capabilities of the torque converter with said mechanical gear box to permit a smooth change between said speed ratios.

Another object of the invention is to provide a mechanism of the above type which has means effective to modulate the interruption of the power transmitting relationship of said torque converter with the gear box whereby the torque converter is gradually returned to full power transmission.

Another object of this invention is to provide a transmission mechanism having a torque converter connected in a series driving relationship with a mechanical gear box; and a control means employing a plurality of pressure regulator valves each connected in a cascade relationship; the first regulator valve being effective to regulate supply pressure which is selectively communicated to certain ones of a plurality of hydraulic actuating devices controlling the speed ratio of said gear box, the second regulator valve being normally biased by a fluid diverter means regulating the pressure supply to a disconnect clutch permitting rotative drive to said torque converter, and a third pressure regulator valve effective to regulate the pressure supply to said torque converter for maintaining a filling of same, said control means being responsive to a change in actuation of said hydraulic devices of said gear box to overcome said fluid diverter and thereby interrupt the power transmitting relationship of said torque converter during said change.

Yet another object is to provide a simple hydraulic control means for a transmission mechanism employing a torque converter in series with a mechanical change-speed gear box, said control means having fewer elements and a simplified construction compared to other controls permitting a selective interruption of the torque converter power transmitting capabilities.

Other objects, advantages, and novel aspects of the invention will become apparent upon the following detailed description in conjunction with the accompanying drawings wherein:

FIGURE 1A and FIGURE 1B comprise a generally schematic illustration of a power transmitting mechanism, showing certain of the elements in cross-section, and embodying the principles of this invention;

FIGURE 2 is an elevational view, partly shown in central section, of the torque converter and disconnect clutch forming part of the mechanism of FIGURE 1; and FIGURE 3 is a fragmentary elevational view, partly shown in section, of an alternative construction of a torque converter employing a disconnect clutch for the turbine element and thereby constituting an alternative embodiment to that shown in FIGURE 2.

Turning now to the drawings, more particularly to FIGURE 1, the power transmitting mechanism of this invention broadly comprises rotative input means A, and a rotative output means B, a hydraulic torque converter or hydrodynamic coupling C drivingly connected to the input means A, a mechanical transmission means N having a plurality of gears providing for variable speed ratios, said mechanical gear means being inter-connected with said torque converter and output means B. A hydraulically actuated friction device D is interposed between said input means and said torque converter for providing a selective disconnection therebetween; a plurality of hydraulically actuated friction devices E are provided for section of one of a plurality of speed ratios of said mechanical means N. A hydraulic control means F is employed comprising a supply means G comprising a pump P effective to draw fluid from a sump S, and having a manual selector means H effective to communicate said supply means with one of a plurality of said hydraulic friction devices E for operating said mechanical means, said control means F having a pressure regulating means I employing a plurality of regulating valves connected in cascade fashion, said regulating means also including a fluid diverter J for biasing certain of said regulating valves for maintaining a normal supply of pressure to said hydraulic device D. The regulating means also has a pressure responsive delay means K effective to graduate the re-engagement of said hydraulic device D. The control means includes conventional components such as a cooler L and lubrication means M.

Turning now in more particularity to the components thereof, the input means A comprises a conventional ring gear 20 having teeth 20a permitting on its outer periphery a driving connection to an engine or prime mover; the hub of ring 20 has input shaft 21 splined thereto, the inner end of the input shaft has a flanged portion 22; the outward end of the shaft and ring gear is closed by a cap 23 fastened thereon.

The torque converter C has a housing 25 comprised of a front portion 25a and a rear portion 25b sealingly interconnected. The front portion has a central opening 26 for receiving said input shaft 21 journalled therein as will be described. Other openings 27 provide for circulation of oil vapor as may be collected within the housing 25. The rear portion 25b of the housing carries an integral block portion 28 effective to carry fluid inlet means.

Disposed within the housing 25 is the hydraulically actuated disconnect clutch D which particularly comprises a rotative input plate 30 drivingly connected to an outer portion of flange 22 of the input shaft 21 and carries a plurality of annular friction elements 31 splined to the outer surface of plate 30. The output portion of the disconnect clutch comprises a drum 32 having an annular 32a drivingly connected by suitable fasteners 33 to the cast shell 34 of the impeller 35 of the torque converter. The internal surface 32b carries a plurality of friction elements 36, interleaved with the friction elements 32 of the input plate, and are drivingly splined to said surface 32b. A depending end portion 32c of drum 32 is attached by suitable fasteners 38 to a support wheel 39 which in turn is journalled between a plurality of bearings 40, 41 and 42. The wheel 39 has an inner hub provided with a sleeve-like projection 39a carried between the inner portion of bearing 40 and the outer portion of bearing 41, said bearing 40 being journalled within the central opening 26 of the front portion 25a of the housing and bearing 41 is journalled about the outer surface of the input shaft 21. The recessed portion 39b of the wheel 39 journals bearing 42 which is disposed about the outer surface of input shaft 21 also. The outer portion of the wheel 39 has a cylindrical surface 39c upon which is slideably received a piston 43 forming part of the disconnect clutch. The outer periphery of the piston 43 is drivingly keyed to the drum 32 by drive pin 44 while free to move axially with respect thereto. Piston 43 carries a pressure surface 43a which may be urged toward the interleaved elements 31 and 36, the reaction of said piston and elements being taken on an annular reaction ring 45 which is also drivingly keyed to the drum 32 by at least one radially disposed pin 46.

The torque converter C has impeller 35 provided with a hub portion 35a which is rotatively supported by a bearing 46 which in turn is journalled about an intermediate sleeve shaft 47. The sleeve shaft 47 has one end 47a journalled within the opening 48 of the rear housing portion 25b and is fixed therewith. The other end 47b of the sleeve 47 carries a plurality of splines which are intermeshed with the complementary splines formed on the interior surface of hub 49 to form a part of the stator element 50 of the torque converter.

Turbine 51 of the torque converter is drivingly carried upon a hub member 52 which has a plurality of internal splines drivingly keyed to splines formed upon one end of an intermediate output shaft 53; the output shaft 53 has one end journalled within a central opening 54 of the input shaft 21 and at opposite ends 53b extending outwardly of the housing 25 and has a flange 56 to which may be connected input elements of a mechanical gear means. The impeller 35, stator 50 and turbine 51 together define a toroidal fluid chamber and are arranged in the hydraulic circuit to constitute a converter of the single stage type.

The toroidal torque converter chamber 56 is filled with fluid from inlet conduit 29 which communicates with a passage 57 opening to the leading edge of the impeller element 35. Fluid is supplied to the actuating chamber 58 of the hydraulic disconnect clutch by coaxially aligned bores 59 provided in the intermediate shaft 53 communicating with bore 54 and by way of radial passages 60 and 61 the latter extending radially outwardly through wheel 39 and communicating with the chamber 58.

Turning now to FIGURES 1A and 1B, the control means broadly designated as F has a fluid supply G comprised of sumps from which is drawn fluid through a conduit 63 communicating with a pump P of any conventional type such as rotary gear type. The sump S has a filter 65; the output of the pump P is carried by a conduit 66 which would normally flow through a filter 67 or through a passage 68 in parallel with passage 67 the latter having a ball check valve 69 which may be effective to open, for example, at 15 to 20 p.s.i. Said supply pressure is communicated first to the manual selector means H by a conduit 70.

The selector valve H has a housing 71 provided with a high pressure inlet 72 in communication with conduit 70; a selector arm 73 is journalled about the inlet 72 and has a passage-way 73a therein effective to communicate the outer extremity of the arm with one of the plurality of fluid outlets 74, said fluid outlets being arcuately arranged in the bottom portion of the housing 71. A low pressure fluid inlet 75 is also disposed in the bottom portion of the housing 71 and is effective to maintain all of the non-selected outlets 74 full of low pressure. One each of a modulating outlet or orifice 76 is interposed between the fluid outlets 74; said orifices all being commonly connected to a conduit 77 and in each having a ball check valve 78 effective to permit fluid to flow through when above a predetermined pressure.

The hydraulic clutches E each have dual actuating chambers (not shown) for actuating said clutches in one of two opposite directions for selecting a specific gear ratio. Each of said actuating chambers is in communication with one outlet 74 of said selector means by virtue of one of a plurality of conduits 79; said double acting clutches may be of the type disclosed in U.S. Patent No. 2,979,963 commonly assigned to the assignee of this application and the disclosure of said patent is incorporated herein by reference.

The pressure regulating means I comprises a valve block 80 having a first regulator valve assembly 81, a second regulator valve assembly 82 and a third regulator valve assembly 83 therein; the block 80 is closed by top plate 89 and bottom block 90. The first regulator valve assembly comprises a cylindrical stepped bore 84 provided in block 80 and has a first portion 84a and a reduced portion 84b with a valve spool 85 slideable therein. An annular groove 86 is defined in the wall of the bore 84 and is in fluid communication with conduit 70 for receiving supply pressure from said pump 64. Spaced from said groove 86 is another annular groove 87 communicating with a passage 88 leading in cascade fashion to an inlet to the second regulator valve assembly 82.

The valve spool has a bottom annular land 85a provided with an orifice 91 communicating the space between the lands 85a and 85b with the head of the bore 84 thereby permitting pressure to exert a force upward toward a coiled spring 92 having a predetermined rate for regulating the main pressure supply which is fed to the clutches by way of the selector means. The coiled spring 92 has one end 92a bearing against the top plate 89 and a bottom portion bearing against the flanged head 85c of the valve spool 85. A supplementary control 93 employs a check valve comprised of internal passages 84 communicating the space between lands 85a, 85b with the head of the valve assembly 81. A ball valve member is urged by spring 96 to open at a predetermined pressure permitting passage of controlled fluid to the head of the valve.

The valve assembly 82 has a fluid inlet 98 communicating passage 88 with an internal stepped cylindrical bore 99 extending between the top plate 89 and the bottom block 90. Stepped bore 99 has a first portion 99a and an enlarged portion 99b with a valve spool 100 slideable in the smaller portion 99a. Fluid pressure received from the first valve assembly 81 is communicated from passage 88 to the clutch-actuating chamber 58 of the disconnect clutch by way of conduit 101. Spool 100 has an orifice 102 provided in the upper land 100a which permits pressure to be communicated to the head of the valve and thereby exert a downward pressure on the valve member against the effect of a coiled spring 103 having a predetermined rate for regulating the disconnect clutch supply pressure. Spring 103 has one end 103a bearing against the bottom head 100c of the valve member and another end 103b bearing against a slideable piston forming part of the fluid diverter J as will be described. The bore 99 has an annular groove 104 spaced from the fluid inlet 98 and communicating with the fluid inlet of valve assembly 83 by passage 105.

Regulator valve assembly 83 is primarily a convertor pressure limit valve and comprises a fluid inlet 106 comprising in part an enlarged annular groove 107 defined in the wall of a cylindrical stepped bore 108 extending through the valve body between the top plate 89 and the bottom block 90. Stepped bore 108 has a first portion 108a and an intermediate reduced portion 108b. Another annular groove 109 is provided in spaced relation to the first fluid inlet 106 and communicated, by way of conduit 110, with a low pressure inlet to the manual selector means as well as with the outlet 111 of the oil cooler L which leads to the transmission lubrication system; a pressure regulator valve 112 is placed in the line communicating the outlet of the oil cooler with the lubrication system M.

An orifice 113 is provided in the upper land of the valve spool 114 communicating fluid pressure to exert a downward force against a regulating spring 115. The regulating spring has an upper end bearing against the valve spool 114 and a bottom end bearing against a cupped retainer 116 which cradles a regulating spring as will be described.

Each of the stepped portions of the respective bores 84, 99 and 108 of the above assemblies have a communication for exhaust returning to sump.

The fluid diverter J is comprised of the moveable piston 117 slideable in one portion 118a of a stepped bore 118 defined in the bottom block 90. High pressure supply fluid is normally communicated between the lands 117a and 117b of piston 117 by a conduit 119 as said piston is normally biased downwardly by spring 116 to subject fluid pressure against the bottom of piston 120 assisting the regulating force of spring 103 of the disconnect clutch limiting valve 82. Should the supply pressure be relieved from such normal diversion against said piston 120, the piston 120 would drop thereby decreasing the spring rate allowing the disconnect clutch supply pressure to drop and thereby release said clutch.

Means for overcoming said normal fluid diverter J, in response to movement of the selector arm for changing the speed ratio of said gear box, employs a plurality of conduits 74 leading from the bottom of the selector valve and through a principal conduit 77 to one end of piston 117, the communicated pressure being effective to overcome the bias of spring 116 shifting piston 117 upwardly and blocking fluid from conduit 119 to bias piston 120 upwardly resulting in the disconnection of clutch D.

Upon the completion of a speed ratio change, high pressure fluid from a conduit 70 is no longer communicated through said pluralities of passages 74 to the bottom of piston 117 and piston 117 is urged to return to its normal communicating position. The modulator or delay means K is employed to graduate the movement of piston 117 to or from the normal communicating position. Such delay means comprises a first check valve 121 interposed in conduit 77 to regulate movement of piston 117 away from its normal communicating position and has a valve disc 122 provided with a small orifice therein (123); the valve disc is normally urged closed by a spring 124 and opens at a predetermined pressure. The check valve 121 is phased whereby fluid normally flows through a small orifice 123 until such time that pressure is sufficient to force open the disc against spring pressure and thereby permit full fluid flow. Also a second check valve 124 is interposed between bore 118 and the piston 120 to regulate return of the piston 117 back to the normal communicating position and comprises structure similar to valve 121 wherein there is a disc 125, an orifice 126 and spring 127. Valve 124 phases the flow of fluid away from piston 120 to sump outlet 128.

In operation, the normal power transmitting condition of the control system consists of having the fluid pressure derived from pump P regulated at three pressures by way of regulator means I for the various needs of the transmission. A first predetermined pressure is governed by the valve assembly 81 under the action of spring 92; this first pressure is communicated by way of conduit 70 to the selector valve H at the inlet 72 thereof and is available to maintain any of the clutches E in an engaged condition if so permitted by alignment of the selector arm 73 (which has an internal conduit 73 therein) with any of the spaced ports 74. The spill-off of the valve assembly 81 is cascaded to the valve assembly 82 to determine a second predetermined pressure by the combined action of spring 103 and the fluid biased member 120. This second pressure is normally communicated by way of conduit 101 to brake D to hold the reactor of the torque converter. The spill-off of valve assembly 82 is cascaded to valve assembly 83 for determining a third predetermined pressure under the action of spring 115; the third pressure is communicated to the torque converter for maintaining a filling thereof and is continuously circulated therethrough.

The interior of the selector means H, the spill-off of the last valve assembly 83 of means I, and the outlet from the torque converter housing are all returned to the sump S by way of conduit 111 or other suitable connections to complete the hydraulic circuit. The hydraulic lines or conduits leading to the clutches E are all supply lines since the action therein is hydrostatic and need not have circulation. In this normal power condition of the transmission, the torque converter receives pressure and, since the disconnect clutch is receiving pressure, the rotary input is connected to impeller (and in the case of the embodiment of FIGURE 2, to the turbine) to promote torque multiplication within the converter; the power received from the torque converter is conveyed in series to the gear box M which is at a selected speed ratio.

If a change in speed ratio within the gear box M is desired, the selector arm 73 is rotated about the journalling conduit 73 so as to move the outer end of the arm 73 (having a nipple or fluid outlet) into alignment with one of the other ports 74 leading to another clutch. However, in re-aligning the selector arm 73, the nipple *must* transgress across one of the intermediate ports 76 which are interposed in the arcuate path or arrangement of ports 74. In so doing, a momentary pressure signal is injected into the conduit 77 which is effective to actuate the pressure responsive shut-off valve J to eliminate the hydraulic bias on member 120 thereby removing one of the forces regulating the second predetermined pressure conveyed to the brake D. In so doing, the brake pressure is substantially reduced causing the brake to be disengaged. Delay means K is employed to modulate the rapidity of action of relieving the clutch pressure as well as restoring the clutch pressure.

While I have described my invention in connection with one specific embodiment and other alternative embodiments thereof, it is to be understood that these are by way of illustration and not by way of limitation and the scope of my invention is defined solely by the appended claims which should be construed as broadly as the prior art will permit.

I claim:

1. A power transmission having a rotary input, comprising: a variable speed-ratio gear train; a hydrokinetic torque converter arranged in series with said gear train, said torque converter having an impeller and a turbine; a hydraulic control system for said gear train and torque converter, said system having a source of fluid pressure, a plurality of hydraulically actuated speed-ratio clutches effective to vary the speed ratio of said gear train, at least one hydraulically actuated disconnect clutch operable to disconnect the input from one of either the impeller or turbine elements of said torque converter, means communicating said fluid pressure source with all of said torque converter, disconnect clutch and speed-ratio clutches, a hydraulic selector means interposed in the fluid communication to said speed-ratio clutches and movable between discrete positions for selectively regulating the fluid communication to at least one of said speed-ratio clutches, a pressure regulator means interposed in all said fluid communicating means and having one portion effective to normally regulate the fluid communication to said selector means at a first pressure, a second portion to regulate fluid communication to said disconnect clutch at a second pressure, and a third portion to regulate fluid communication to said converter at a third pressure, and means responsive to a change of said selector means between said discrete positions for modulating said second portion of the regulating means controlling the fluid pressure communicated to said disconnect clutch for substantially reducing said second pressure resulting in disengagement of said disconnect clutch only during said change.

2. The combination as in claim 1, in which said fluid control means further comprises a pressure responsive delay means for graduating the re-engagement of said disconnect clutch upon selection of a speed ratio of said gear box.

References Cited

UNITED STATES PATENTS

| | | | |
|---|---|---|---|
| 1,960,705 | 5/1934 | Kochling | 192—3.2 |
| 2,550,055 | 4/1951 | Flinn | 74—732 X |
| 2,750,017 | 6/1956 | Ahlen | 192—3.2 |
| 2,965,202 | 12/1960 | Christenson | 192—3.2 |
| 3,058,373 | 10/1962 | Snoy et al. | 74—732 |

JULIUS E. WEST, *Primary Examiner*.